Jan. 2, 1940.  G. H. KEYES ET AL  2,185,343

POLYMETHINE DYES AND PROCESS FOR PREPARING THEM

Filed Sept. 14, 1937

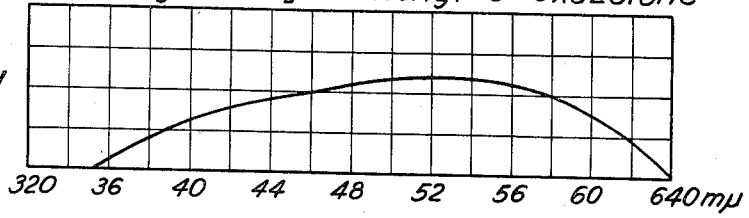

FIG.1 — 4-[(2-Ethyl-1(2)-Benzoselenazolylidene)Ethylidene]-2-Phenyl-5-Oxazolone

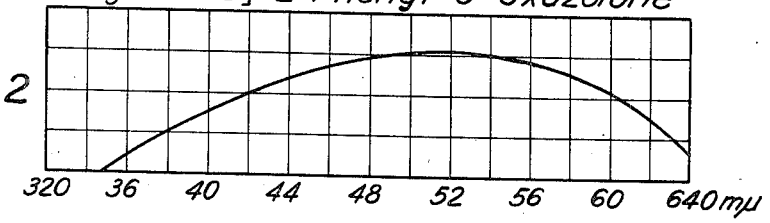

FIG.2 — 4-[(2-Ethyl-1(2)-Benzothiazolylidene)Ethylidene]-2-Phenyl-5-Oxazolone

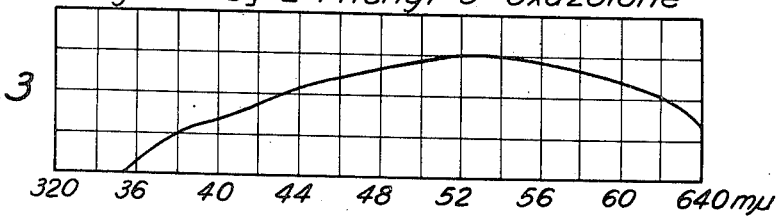

FIG.3 — 4-[(1-Ethyl-2(1)-β-Napthothiazylidene)Ethylidene]-2-Phenyl-5-Oxazolone

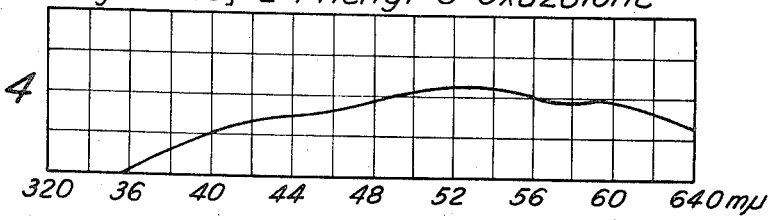

FIG.4 — 4-[(1,6-Dimethyl-2(1)-Quinolylidene)Ethylidene]-2-Phenyl-5-Oxazolone

Grafton H. Keyes
Leslie G.S. Brooker
INVENTOR

N.M. Perrins
BY Daniel J. Mayne
ATTORNEYS

Patented Jan. 2, 1940

2,185,343

UNITED STATES PATENT OFFICE 2,185,343

POLYMETHINE DYES AND PROCESS FOR PREPARING THEM

Grafton H. Keyes and Leslie G. S. Brooker, Rochester, N. Y., assignors to Eastman Kodak Company, Rochester, N. Y., a corporation of New Jersey Application September 14, 1937, Serial No. 163,782
In Great Britain September 15, 1936

10 Claims. (Cl. 260—240)

This invention relates to new dyes and to photographic emulsions sensitized therewith.

We have found that new dyes can be prepared by reacting a monoacylated aminoacetic acid with a formylmethylene compound of one of the following formulas:

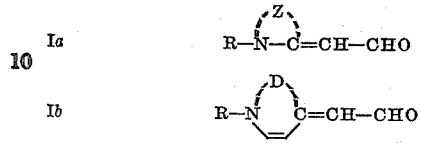

wherein D represents the non-metallic atoms necessary to complete a heterocyclic nucleus, such as a pyridine or a quinoline nucleus for example, Z represents the non-metallic atoms necessary to complete a heterocyclic nucleus, such as a five-membered or six-membered heterocyclic nucleus for example, and R represents an aliphatic radical, i. e. an alkyl group. We have further found that our new dyes sensitize photographic emulsions in a new and useful manner.

Accordingly, it is among the objects of our invention to provide new dyes and a process for preparing the same. A further object is to provide photographic emulsions sensitized with our new dyes and a process for preparing such emulsions. A still further object is to provide a photographic element comprising an emulsion sensitized with our new dyes. Other objects will appear hereinafter.

Our new dyes can be represented by the following general formulas:

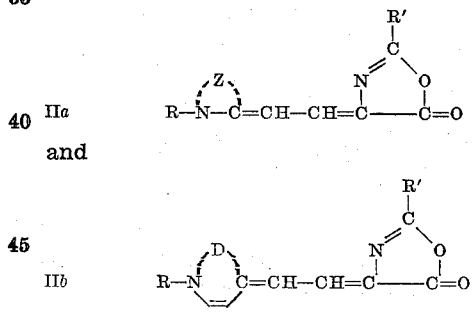

wherein D represents the non-metallic atoms necessary to complete a heterocyclic nucleus, such as pyridine or a quinoline nucleus for example, Z represents the non-metallic atoms necessary to complete a heterocyclic nucleus, R represents an alkyl group and R' represents an alkyl group or an aryl radical.

Our new dyes are probably resonance hybrids between two forms which can be illustrated for the dyes of Formula IIa as follows:

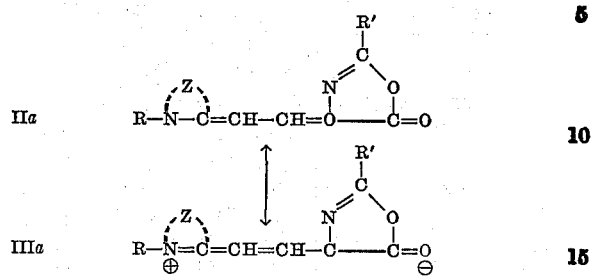

The dyes of Formula IIb can similarly be expressed as resonance hybrids between two forms. In the instant application, we shall formulate our new dyes in accordance with but one of the forms, namely, that set forth by Formulas IIa and IIb.

More specifically, in Formulas IIa and IIb, D represents the non-metallic atoms to complete a pyridine nucleus which may carry substituents such as alkyl, alkoxy, amino or the like or D represents the non-metallic atoms necessary to complete a quinoline nucleus which may carry substituents such as alkyl, alkoxy, amino or the like. Z represents the non-metallic atoms necessary to complete a five-membered or six-membered heterocyclic nucleus, for example a quinoline nucleus, such as a 5-alkyl- or a 5-alkoxyquinoline nucleus, for example, a pyridine nucleus, a thiazole nucleus, such as 4-methylthiazole, 4-phenylthiazole, 4,5-diphenylthiazole, benzothiazole, 4-chlorobenzothiazole, α-naphthothiazole or β-naphthothiazole for example, an oxazole nucleus, such as 4-methyloxazole, 4-phenyloxazole, benzoxazole, α-naphthoxazole or β-naphthoxazole for example, a selenazole nucleus, such as 4-methylselenazole or benzoselenazole for example or a thiazoline nucleus, such as 4-methylthiazoline or 4-phenylthiazoline. R represents an aliphatic radical, such as methyl, ethyl, isoamyl, allyl, n-decyl or cyclohexyl for example. R' represents an aliphatic radical, such as methyl, ethyl or the like, or an aryl group, such as an aryl radical containing one benzene ring or an aryl radical containing two benzene rings which may be fused together for example.

In preparing our new dye, we react a formylmethylene compound of Formula Ia or Ib with a monoacylated aminoacetic acid, such as aceturic acid, hippuric acid or naphthoylaminoacetic acids for example, i. e. acids of the following formula:

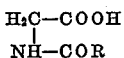

wherein R represents an alkyl or an aryl group for example. The reactions are advantageously conducted in the presence of a water-binding agent. Anhydrides of lower aliphatic acids, particularly aliphatic acids containing from two to four carbon atoms, are advantageously employed as water-binding agents. Diluents can be added to the reaction mixtures. Heat accelerates the formation of our dyes.

While the process of preparing our new dyes is subject to variation, particularly as respects the nature and quantity of formylmethylene compound employed, the nature and quantity of the monoacylated aminoacetic acid employed, the nature and quantity of the water-binding agent employed, the temperatures employed, the order of procedures and methods of isolation and purification of the dyes, the following examples will serve to illustrate the mode of practicing the process of our invention. These examples are not intended to limit our invention.

EXAMPLE 1.—*4-[(1-ethyl-2(1)-β-naphthothiazolylidene) ethylidene]-2-phenyl-5-oxazolone*

1.28 g. (1 mol.) of 1-ethyl-2-formylmethylene-β-naphthothiazoline and 0.90 g. (1 mol.) of hippuric acid were stirred in about 15 cc. of acetic anhydride for about seven minutes at about 100° C. The cooled reaction mixtures was stirred with 100 cc. of diethyl ether and the whole chilled to 0° C. The dye separated and was filtered off. The dye was boiled with about 10 cc. of methyl alcohol. The alcoholic mixture was chilled at 0° C. for several hours. The dye separated and was recrystallized from glacial acetic acid. It was obtained as dull purple crystals melting at 242° to 243° C. with decomposition. The formula of the dye can be represented as follows:

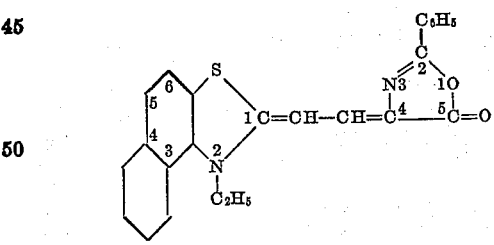

EXAMPLE 2.—*4-[(2-ethyl-1(2)-benzothiazolylidene) ethylidene]-2-phenyl-5-oxazolone*

1.03 g. (1 mol.) of 2-ethyl-1-formylmethylenebenzothiazoline and 0.90 g. (1 mol.), of hippuric acid were stirred in about 10 cc. of acetic anhydride at about 100° C. for about ten minutes. The dye was isolated as in Example 1. After two recrystallizations from acetic acid, the dye was obtained as minute reddish crystals melting at 211° to 212° C. with decomposition. The dye can be represented by the following formula:

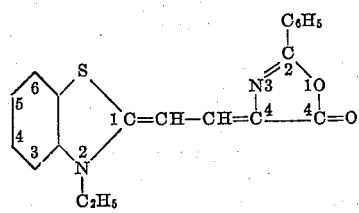

EXAMPLE 3.—*4-[(3-methyl-2(3)-thiazolinylidene) ethylidene]-2-phenyl-5-oxazolone*

0.48 g. (1 mol.) of 2-formylmethylene-3-methylthiazolidine and 0.60 g. (1 mol.) of hippuric acid were heated together in about 10 cc. of acetic anhydride for about seven minutes at about 100° C. The dye was isolated as in Example 1. After two recrystallizations from methyl alcohol, it was obtained as orange needles, melting at 210° to 212° C. with decomposition. The formula of the dye can be expressed as follows:

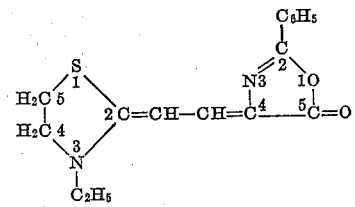

EXAMPLE 4.—*4-[(3-ethyl-4-methyl-2(3)-thiazolylidene) ethylidene]-2-phenyl-5-oxazolone*

0.85 g. (1 mol.) of 3-ethyl-4-methyl-2-formylmethylene-Δ⁴-thiazoline and 0.90 g. (1 mol.) of hippuric acid were heated in 15 cc. of acetic anhydride for about seven minutes at 100° C. The dye was isolated as in Example 1. After two recrystallizations from glacial acetic acid, the dye was obtained as dark red needles melting at 209° to 211° C. with decomposition. The dye has the following formula:

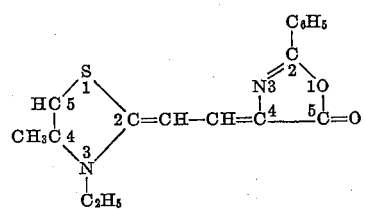

EXAMPLE 5.—*4-[(1,6-dimethyl-2(1)-quinolylidene) ethylidene]-2-phenyl-5-oxazolone*

1.00 g. (1 mol.) of 2-formylmethylene-1,6-dimethyl-1(2)-dihydroquinoline and 0.90 g. (1 mol.) of hippuric acid were heated in 30 cc. of acetic anhydride for about seven minutes at about 100° C. The dye was isolated as in Example 1. After two recrystallizations from glacial acetic acid, the dye was obtained as very dark blue crystals melting at 247° to 248° C. with decomposition. The formula of the dye can be expressed as follows:

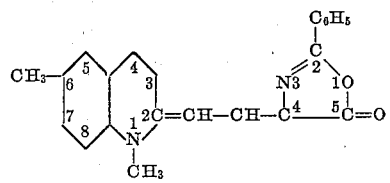

EXAMPLE 6.—*4-[(1-methyl-4(1)-quinolylidene) ethylidene]-2-phenyl-5-oxazolone*

0.93 g. (1 mol.) of 4-formylmethylene-1-methyl-1(4)dihydroquinoline and 0.90 g. (1 mol.) of hippuric acid were heated in about 30 cc. of acetic anhydride for about seven minutes at about 100° C. The dye was isolated as in Example 1. After two recrystallizations from acetic acid, the dye was obtained as purple crystals melting at 262° to 263° C. with decomposition. The dye has the following formula:

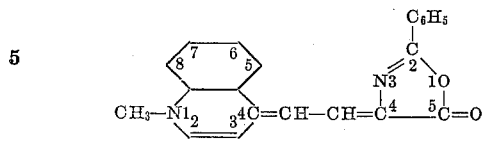

EXAMPLE 7.—*4-[(1-ethyl-2(1)-β-naphthothiazylidene)-ethylidene]-2-methyl-5-oxazolone*

1.28 g. (1 mol.) of 1-ethyl-2-formylmethylene-β-naphthothiazoline and 0.59 g. (1 mol.) of aceturic acid were heated in acetic anhydride for about five minutes at 100° C. The dye was isolated as in Example 1. After two recrystallizations from glacial acetic acid, the dye was obtained as a mat of minute orange crystals melting at 258° to 259° C. with decomposition. The dye has the following formula:

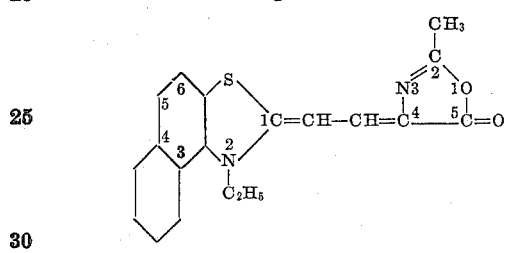

Our new dyes can also be prepared, we have found, by reacting the monoacylated aminoacetic acid with a cyclammonium quaternary salt containing a β-arylaminovinyl group in the alpha or gamma position, i. e. one of the so-called reactive positions. The β-arylaminovinyl group is advantageously acylated, e. g. acetylated, propionylated or butyrylated. The reactions are advantageously effected in the presence of an acid-binding agent and a water-binding agent. As acid-binding agents, we have found salts of lower aliphatic acids, such as acetic, propionic and butyric, to be particularly useful. However, other acid-binding agents can be employed. For example, strong organic bases, i. e. organic bases having a dissociation constant substantially greater than that of pyridine, such as triethylamine and piperidine, can be used. Likewise, sodium carbonate, sodium hydroxide, potassium carbonate or sodium ethylate can be employed. As water-binding, we have found fatty acid anhydrides, particularly anhydrides of lower fatty acids such as acetic, propionic or butyric acids, to be particularly suitable. Diluents can be added to the reaction mixtures. Heat accelerates the formation of our new dyes.

While this process of preparing our new dyes is subject to variation, particularly as respects the nature and quantity of β-arylaminovinyl quaternary salt employed, the nature and quantity of the monoacylated aminoacetic acid employed, the nature and quantity of the acid-binding agent employed, the nature and quantity of the water-binding agent employed, the temperatures employed and the order of procedures and methods of isolation and purification of dyes, the following examples will serve to illustrate the mode of practicing the process of our invention. These examples are not intended to limit our invention.

EXAMPLE 8.—*4-[(2-ethyl-1(2)-benzoselenazolylidene)-ethylidene]-2-phenyl-5-oxazolone*

1.25 g. (1 mol.) of 1-(β-acetanilidovinyl)-benzoselenazole ethiodide, 0.45 g. (1 mol.) of hippuric acid and 0.20 g. (1 mol.) of anhydrous sodium acetate were heated in about 10 cc. of acetic anhydride at the refluxing temperature for about fifteen minutes. The reaction mixture was chilled for several hours at 0° C. The dye which separated was filtered off and washed with water. After two recrystallizations from methyl alcohol, the dye was obtained as reddish crystals melting at 218° to 220° C. with decomposition. The dye has the following formula:

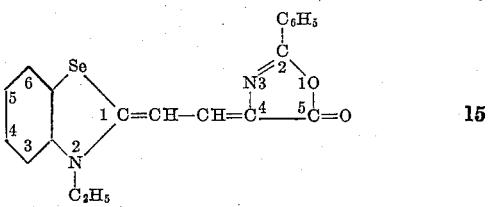

EXAMPLE 9.—*4-[(2-ethyl-1(2)-benzoxazolylidene)-ethylidene]-2-phenyl-5-oxazolone*

2.2 g. (1 mol.) of 1-(β-acetanilidovinyl)-benzoxazole ethiodide, 0.9 g. (1 mol.) of hippuric acid and 0.4 g. (1 mol.) of anhydrous sodium acetate were heated for about ten minutes in about 15 cc. of acetic anhydride at about 100° C. The dye was isolated as in Example 8. After two recrystallizations from glacial acetic acid, the dye was obtained as minute dull reddish crystals melting at 233° to 235° C. with decomposition. The dye has the following formula:

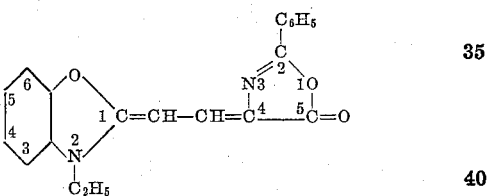

EXAMPLE 10.—*4-[(3-methyl-2(3)-thiazolinylidene)-ethylidene]-2-phenyl-5-oxazolone*

1.7 g. (1 mol.) of 2-(β-anilinovinyl)-thiazoline methiodide, 0.9 g. (1 mol.) of hippuric acid and 0.4 g. (1 mol.) of anhydrous sodium acetate were heated in about 15 cc. of acetic anhydride at the refluxing temperature for about 15 minutes. The dye was isolated as in Example 8. After two recrystallizations from methyl alcohol, the dye was obtained as orange needles melting at 210° to 212° C. with decomposition. The dye has the following formula:

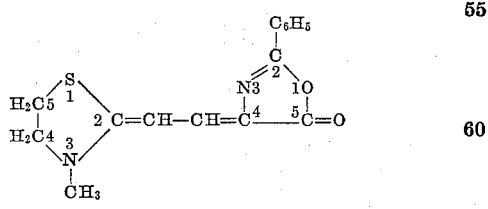

EXAMPLE 11.—*4-[(1-ethyl-2(1)-quinolylidene)ethylidene]-2-phenyl-5-oxazolone*

2.0 g. (1 mol.) of 2-(β-anilinovinyl)-quinoline ethiodide, 0.9 g. (1 mol.) of hippuric acid and 0.4 g. (1 mol.) of anhydrous sodium acetate were heated in about 15 cc. of acetic anhydride at the refluxing temperature for about fifteen minutes. The dye was isolated as in Example 8. After two recrystallizations from methyl alcohol, the dye was obtained as dark greenish plates melting at 224° to 226° C. with decomposition. The dye has the following formula:

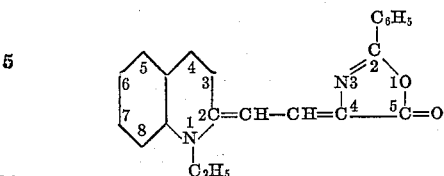

EXAMPLE 12.—4-[(1-ethyl-4(1)-quinolylidene) ethylidene]-2-phenyl-5-oxazolone 2.0 g. (1 mol.) of 4-(β-anilinovinyl)-quinoline ethiodide, 0.9 g. (1 mol.) of hippuric acid and 0.4 g. (1 mol.) of anhydrous sodium acetate were heated for about fifteen minutes in about 15 cc. of acetic anhydride at about 100° C. The dye was isolated as in Example 8. After two recrystallizations from methyl alcohol, the dye was obtained as greenish needles melting at 205° to 208° C. with decomposition. The dye has the following formula:

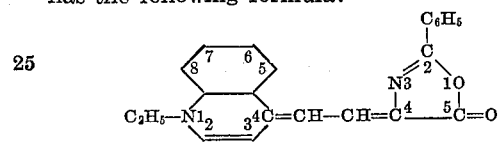

EXAMPLE 13.—4-[(2-ethyl-1(2)-benzothiazolylidene) ethylidene]-2-methyl-5-oxazolone 2.25 g. (1 mol.) of 1-(β-acetanilidovinyl)-benzothiazole ethiodide, 0.6 g. (1 mol.) of aceturic acid and 0.4 g. (1 mol.) of anhydrous sodium acetate were heated at the refluxing temperature in about 15 cc. of acetic anhydride for about ten minutes. The dye was isolated as in Example 8. After two recrystallizations from methyl alcohol, the dye was obtained as brownish crystals melting at 256° to 258° C. with decomposition. The dye has the following formula:

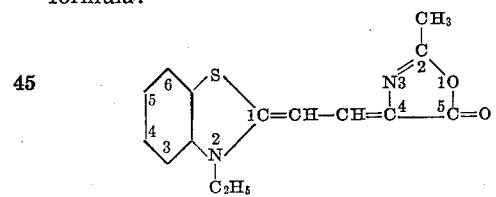

EXAMPLE 14.—4-[(2-ethyl-1(2)-benzoxazolylidene) ethylidene]-2-methyl-5-oxazolone 2.2 g. (1 mol.) of 1-(β-acetanilidovinyl)-benzoxazole ethiodide, 0.6 g. (1 mol.) of aceturic acid and 0.4 g. (1 mol.) of anhydrous sodium acetate were heated in about 15 cc. of acetic anhydride for about ten minutes at about 100° C. The dye was isolated as in Example 8. After two recrystallizations from methyl alcohol, the dye was obtained as brownish crystals melting at 213° to 215° C. with decomposition. The dye has the following formula:

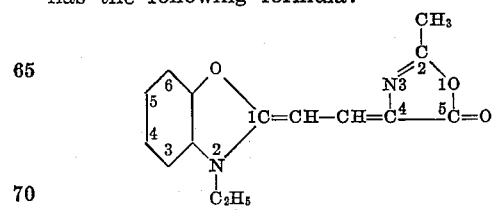

EXAMPLE 15.—2-ethyl-4-[(2-ethyl-1-(2)-benzothiazolylidene) ethylidene]-5-oxazolone 2.25 g. (1 mol.) of 1-β-acetanilidovinyl)-benzothiazole ethiodide, 0.65 g. (1 mol.) of propionyl glycine and 0.4 g. (1 mol.) of anhydrous sodium acetate were heated at the refluxing temperature in about 15 cc. of acetic anhydride for about ten minutes. The dye was isolated as in Example 8. After two recrystallizations from methyl alcohol, the dye was obtained as brownish crystals melting at 251° to 253° C. with decomposition. The dye has the following formula:

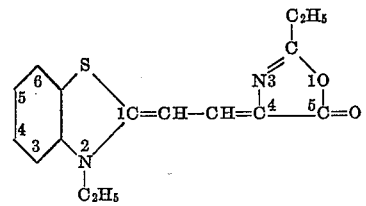

In the above examples, we have found it advantageous to employ about one molecular proportion of formylmethylene compound or cyclammonium quaternary salt for each mole of acylated aminoacetic acid. However, an excess of either can be employed. The monoacylated aminoacetic acids are well known compounds and can be prepared by acylated glycine, i. e. aminoacetic acid. The following examples are illustrative of such acylations:

EXAMPLE 16.—Aceturic acid 7.5 g. (1 mol.) of glycine were heated at about 100° C. in 11 g. (1.1 mol.) of acetic anhydride for about five minutes. The reaction mixture was chilled, the crystals which separated collected on a filter and washed with diethyl ether. The washed product was recrystallized from water and obtained as colorless crystals melting at 204° to 206° C. with decomposition.

EXAMPLE 17.—Propionylglycine 7.5 g. (1 mol.) of glycine were heated at about 100° C. in 15 g. (1.1 mol.) of propionic anhydride for about ten minutes. The reaction mixture was chilled, the crystals which separated collected on a filter and washed with diethyl ether. The washed product was recrystallized from methyl alcohol and obtained as colorless crystals melting at 130° to 133° C. with decomposition.

The cyclammonium quaternary salts containing a β-arylaminovinyl group in a reactive position can be prepared by condensing a clycammonium quaternary salt containing a reactive methyl group in a reactive position with a diarylformamidine. If the condensation is carried out in the presence of an organic acid anhydride, the resulting condensation product is ordinarily acylated. The process of making the β-arylaminovinyl compounds is well known and the following few examples will serve to illustrate the preparation:

EXAMPLE 18.—1-(β-Acetanilidovinyl)-benzoxazole ethiodide 58 g. (1 mol.) of 1-methylbenzoxazole ethiodide and 40 g. (1 mol.) of diphenylformamidine were heated in about 250 cc. of acetic anhydride for about twenty minutes at the refluxing temperature. The product separated from the chilled reaction mixture. It can be employed without further purification.

EXAMPLE 19.—1-(β-Acetanilidovinyl)-benzothiazole ethiodide 67 g. (1 mol.) of 1-methylbenzothiazole ethiodide and 40 g. (1 mol.) of diphenylformamidine were heated in about 250 cc. of acetic anhydride for about twenty minutes at the refluxing temperature. The product separated from the chilled reaction mixture. It can be employed without further purification.

EXAMPLE 20.—4-(β-Anilinovinyl)-quinoline ethiodide 29.9 g. (1 mol.) of lepidine ethiodide and 19.6 g. (1 mol.) of diphenylformamidine were heated at from 150° to 160° C. for about ten minutes with stirring. The reaction mixture was cooled and ground with acetone. The acetone-treated product was recrystallized from methyl alcohol and obtained as red crystals melting at 248° to 250° C. with decomposition.

The formylmethylene compounds employed in the above examples are prepared by hydrolyzing the β-arylamino compounds. The method of preparation is fully described in British Patent No. 466,268. The following example is illustrative of the preparation:

EXAMPLE 21.—3-ethyl-4-methyl-2-formylmethylene-Δ⁴-thiazoline 7.44 g. (1 mol.) of 2-(β-anilinovinyl)-4-methylthiazole ethiodide and 1.45 g. (1.1 mol.) of 85% powdered potassium hydroxide were heated in about 20 cc. of 95% ethyl alcohol at the refluxing temperature for about six hours. The reaction mixture was poured into about 100 cc. of cold water and the resulting mixture chilled for about twelve hours at 0° C. The crude product which separated was filtered off and washed with water. After two recrystallizations from ligroin (boiling point 90° C. to 120° C.) the formylmethylene compound was obtained as brownish-yellow crystals melting at 120° to 123° C. with decomposition.

Our new dyes give rise to photographic emulsions possessing novel sensitivity when incorporated in the emulsions. Our invention is particularly directed to the customarily employed gelatino-silver-halide emulsions. However, our new dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light-sensitive. By way of illustration, the herein-described sensitized photographic emulsions were prepared by employing ordinary gelatino-silver-bromide emulsions.

In the preparation of photographic emulsions containing our new dyes, it is only necessary to disperse the dyes in the emulsions. The methods of incorporating dyes in emulsions are simple and well known to those skilled in the art. In practicing our invention, it is convenient to add the dyes from their solutions in appropriate solvents. The solvent must, of course, be compatible with the emulsion, substantially free from any deleterious effect on the light-sensitive materials and capable of dissolving the dyes. Methanol or acetone have proven satisfactory as a solvent for our new dyes. The dyes are advantageously incorporated in the finished, washed emulsion and should be uniformly distributed throughout to secure the best results.

The concentration of our new dyes in the emulsions can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a flowable gelatino-silver-halide emulsion with stirring. Stirring is continued until the dye is uniformly and practically homogeneously dispersed. Ordinarily 10 to 20 mg. of dye per 1000 cc. of flowable emulsion will suffice to produce the maximum sensitizing effect with the ordinary gelatino-silver-halide emulsions. The above statements are only illustrative and not to be understood as limiting our invention in any sense, as it will be apparent that our dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver halide emulsion whereby the dye exerts a sensitizing effect upon the emulsions, as well as a photographic element comprising a support, ordinarily transparent, upon which the light-sensitive emulsion is coated or spread and allowed to dry.

The accompanying drawing is by way of illustration and depicts the sensitivity of emulsions containing four of our new dyes. Each figure in the drawing is a diagrammatic reproduction of a spectrogram showing the sensitivity of a silver bromide emulsion containing one of our new dyes.

In Fig. 1, the sensitivity of an ordinary gelatino-silver-bromide emulsion containing 4-[(2-ethyl-1(2)-benzoselenazolylidene) ethylidene]-2-phenyl-5-oxazolone is depicted.

In Fig. 2, the sensitivity of an ordinary gelatino-silver-bromide emulsion containing 4-[(2-ethyl-1(2)-benzothiazolylidene) ethylidene]-2-phenyl-5-oxazolone is depicted.

In Fig. 3, the sensitivity of an ordinary gelatino-silver-bromide emulsion containing 4-[(1-ethyl-2(1)-β-naphthothiazylidene) ethylidene]-2-phenyl-5-oxazolone is depicted.

In Fig. 4, the sensitivity of an ordinary gelatino-silver-bromide emulsion containing 4-[(1,6-dimethyl-2(1)-quinolylidene) ethylidene]-2-phenyl-5-oxazolone is depicted.

We have found that these of our new dyes containing a 1,2-dihydrothiazole nucleus, such as a 1,2-dihydrobenzothiazole or a 1,2-dihydronaphthothiazole nucleus, are particularly useful in preparing sensitized gelatino-silver-chloride or bromide emulsions. As shown in the drawing, such dyes produce emulsions strongly sensitized in the region of 520 mu and the sensitivity extends far out, at least to 640 mu.

Still further examples illustrating our invention could be cited, but the foregoing will be sufficient to teach those skilled in the art the manner in which our invention is carried out.

What we claim as our invention and desire to be secured by Letters Patent of the United States is:

1. A dye characterized by one of the following formulas:

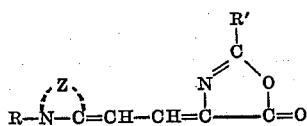

and

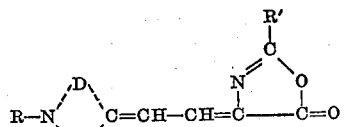

wherein D represents the non-metallic atoms necessary to complete a heterocyclic nucleus selected from the group consisting of pyridine nuclei and quinoline nuclei, R represents an alkyl group, R' represents an organic group selected from the group consisting of alkyl groups and aryl groups containing from one to two benzene rings and Z represents the non-metallic atoms necessary to complete a heterocyclic nucleus selected from the group consisting of five-membered and six-membered heterocyclic organic nuclei.

2. A dye characterized by the following formula:

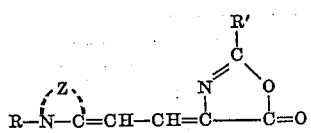

wherein R represents an alkyl group, R' represents an organic group selected from the group consisting of alkyl groups and aryl groups containing from one to two benzene rings and Z represents the non-metallic atoms necessary to complete a five-membered heterocyclic organic nucleus.

3. A dye characterized by the following formula:

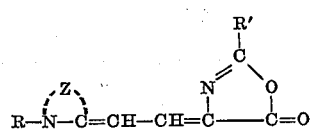

wherein R represents an alkyl group, R' represents an organic group selected from the group consisting of alkyl groups and aryl groups containing from one to two benzene rings and Z represents the non-metallic atoms necessary to complete a heterocyclic nucleus of the azole series.

4. A dye characterized by the following formula:

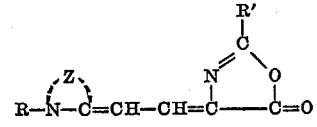

wherein R represents an alkyl group, R' represents an organic group selected from the group consisting of alkyl groups and aryl groups containing from one to two benzene rings and Z represents the non-metallic atoms necessary to complete a naphthothiazole nucleus.

5. A dye characterized by the following formula:

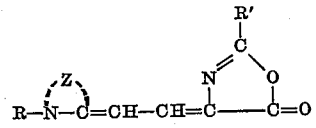

wherein R represents an alkyl group, R' represents an organic group selected from the group consisting of alkyl groups and aryl groups containing from one to two benzene rings and Z represents the non-metallic atoms necessary to complete a benzothiazole nucleus.

6. A dye characterized by the following formula:

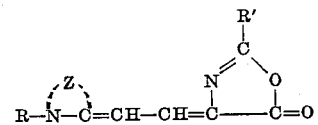

wherein R represents an alkyl group, R' represents an organic group selected from the group consisting of alkyl groups and aryl groups containing from one to two benzene rings and Z represents the non-metallic atoms necessary to complete a benzoselenazole nucleus.

7. A process for preparing a dye comprising reacting, in the presence of an acid-binding agent and a water-binding agent, a monoacylated aminoacetic acid with a cyclammonium quaternary salt containing a β-arylaminovinyl group in a reactive position.

8. A process for preparing a dye comprising reacting, in the presence of a lower fatty acid anhydride and an alkali salt of a lower fatty acid, a monoacylated aminoacetic acid with a cyclammonium quaternary salt containing a β-aryl-aminovinyl group in a reactive position.

9. A process for preparing a dye comprising reacting, in the presence of a lower fatty acid anhydride and an alkali salt of a lower fatty acid, hippuric acid with a cyclammonium quaternary salt containing a β-anilinovinyl group in a reactive position.

10. A process for preparing a dye comprising reacting, in the presence of a lower fatty acid anhydride and an alkali salt of a lower fatty acid, hippuric acid with a cyclammonium alkiodide containing a β-anilinovinyl group in a reactive position.

GRAFTON H. KEYES.
LESLIE G. S. BROOKER.